(12) United States Patent
Talanov et al.

(10) Patent No.: US 6,597,185 B1
(45) Date of Patent: Jul. 22, 2003

(54) APPARATUS FOR LOCALIZED MEASUREMENTS OF COMPLEX PERMITTIVITY OF A MATERIAL

(75) Inventors: Vladimir Vladimirovich Talanov, Greenbelt, MD (US); Hans M. Christen, Greenbelt, MD (US); Robert Moreland, Edgewater, MD (US)

(73) Assignee: Neocera, Inc., Beltsville, MD (US)

( * ) Notice: Subject to any disclaimer, the term of this patent is extended or adjusted under 35 U.S.C. 154(b) by 254 days.

(21) Appl. No.: 09/665,370

(22) Filed: Sep. 20, 2000

(51) Int. Cl.$^7$ .................. G01R 27/04; G01R 27/26; G01R 31/308; G01N 23/00
(52) U.S. Cl. .................. 324/638; 324/646; 324/690; 324/753; 250/306
(58) Field of Search .................. 324/638, 637, 324/646, 534, 752, 754, 758, 753, 690; 250/306

(56) References Cited

U.S. PATENT DOCUMENTS

| | | | | |
|---|---|---|---|---|
| 5,502,392 A | * | 3/1996 | Arjavalingam et al. | 324/638 |
| 5,508,627 A | * | 4/1996 | Patterson | 324/752 |
| 5,821,410 A | * | 10/1998 | Xiang et al. | 73/105 |
| 5,900,618 A | | 5/1999 | Aniage et al. | |
| 5,936,237 A | * | 8/1999 | van der Weide | 250/234 |
| 6,173,604 B1 | | 1/2001 | Xiang et al. | |

OTHER PUBLICATIONS

M. Fee et al., "Scanning Electromagnetic Transmission Line Microscope with Sub–Wavelength Resolution," Optics Communications, vol. 69, No. 34, Jan. 1, 1989, pp. 219–224.*

* cited by examiner

Primary Examiner—Christine Oda
Assistant Examiner—Anjan K. Deb
(74) Attorney, Agent, or Firm—Rosenberg, Klein & Lee (57) ABSTRACT

An apparatus for localized measurements of complex permittivity of a material is provided. A probe (10) analyzes the complex permittivity of a sample (11), the probe (10) having a balanced two conductor transmission line (12) formed of conductive segments (13 and 14). A probing end (15) of the transmission line (12) is brought within close proximity of sample (11) and an opposite end (16) of the transmission line is connected to a terminating plate (17) to form a resonator structure (18) for measurement of the complex permittivity of sample (11).

19 Claims, 11 Drawing Sheets

APPARATUS FOR LOCALIZED MEASUREMENTS OF COMPLEX PERMITTIVITY OF A MATERIAL

FIELD OF THE INVENTION

The present invention relates to measurement techniques. In particular this invention directs itself to a technique for highly localized measurements of complex microwave permittivity of materials.

More in particular, the present invention relates to a probe for non-destructive determination of complex permittivity of a material based on a balanced two-conductor transmission line resonator which provides confinement of a probing field within a sharply defined sampling volume of the material under study to yield a localized determination of the material's complex permittivity.

BACKGROUND OF THE INVENTION

One of the main goals of the near-field scanning microwave microscopy is to quantitatively measure a material's complex microwave permittivity (dielectric constant and conductivity) with a high sensitivity of lateral and/or depth selectivity (i.e. to determine the material's property over a small volume while ignoring the contribution of that volume's surrounding environment). This is particularly important in measurements on complex structures, such as semiconductor devices or composite materials, where, for example, the permittivity of one line or layer must be determined without knowledge of the properties of the neighboring lines or underlying layers.

In microwave microscopy the basic measurement is a determination of the reflection of a microwave signal from a probe positioned in close proximity to a sample. Phase and amplitude of the reflected signal may be determined directly by using a vector network analyzer or by determination of the resonant frequency and quality factor of a resonator coupled to the probe.

In many cases, the phase of the reflected signal correlates to a large degree with the real part of the sample permittivity, whereas magnitude is dominated by the imaginary part of the permittivity (i.e., the microwave absorption of the sample). Measurements of the microwave transmission from the probe through the sample are also possible, however, such an arrangement generally does not yield a localized determination of a sample's complex permittivity.

Many conventional approaches in microwave microscopy employ a coaxial probe geometry. An alternative to the rotationally-symmetric arrangement of the coaxial probes are planar structures such as a co-planar wave-guide or a strip-line wave-guide. Such an apparatus yields an imaging resolution on the order of the diameter or radius of curvature of the central conductor tip.

It is obvious, however, from considerations of classic electrodynamics that the volume of space over which such an apparatus determines the electrical properties of a sample is determined not by the local dimensions of the central conductor tip alone, but rather by a length scale given by the separation between the central conductor tip and the ground (outer) conductor or shield.

Therefore, in order to determine quantitatively the microwave properties of a material these properties must be devoid of non-uniformities on length scales at least a few times larger than the distance between the probe tip and the ground conductor while sufficient imaging contrast on length scales comparable to the radius of curvature of the tip can be easily achieved.

Furthermore, the inherent unbalanced character of the exposed part of the probe complicates any of the above-mentioned geometries due to the dipole-like current-flow in this area. The amount of radiation is critically dependent on the environment, i.e., the sample's complex permittivity and the probe-to-sample distance, and thus affects the amplitude of the reflected signal (reflection measurement) or quality factor of the resonator (resonant technique). The result is a potentially erroneous determination of the sample's microwave absorption.

SUMMARY OF THE INVENTION

It is, therefore, an object of the present invention to provide a technique for selective localized determination of a complex permittivity of a material.

It is another object of the present invention to provide a novel probe for the non-destructive determination of a sample's complex permittivity based on a balanced two-conductor transmission line resonator which is symmetric with respect to an exchange of signal between the conductors that makes it possible to confine the probing field within the desired sampling volume which significantly reduces dependency of measurements on the sample volume's environment.

It is a further object of the present invention to provide a measurement technique applicable in the frequency domain up to about 100 GHz in which the sample's complex permittivity is determined with high accuracy either by a measurement of the phase and magnitude of a microwave or millimeter-wave signal reflected from the sample, as well as by a measurement of a resonant frequency and quality factor of a resonator formed by (or coupled to) a two-conductor transmission line, or by the capacitance measured between the two conductors of such a transmission line.

Furthermore, it is an object of the present invention to provide an apparatus for highly accurate determination of the complex permittivity of a sample which employs a probe capable of sharply localized measurements which can be easily controlled for modification of sampling volume as well as for the depth profiling.

In accordance with the principles thereof, the present invention is a novel probe for non-destructive measurements which includes a two-conductor transmission line comprising a pair of spatially separated, symmetrically arranged electrical conductors of circular, semi-circular, rectangular, or similar cross-section contour. One end of the transmission line (also referred to herein as the "probing end") is brought into close proximity to the sample to be measured and may be tapered (or sharpened) to an end having very small spatial extent. A signal is fed through the transmission line toward the sample, and a signal reflected from the sample is measured. For this purpose, the opposite end of the transmission line is connected to electronics for the determination of the reflected signal's phase and magnitude. Measurements of the phase and magnitude of the reflected signal are broadband in frequency.

Preferably, for highly sensitive and accurate measurements, while employing less expensive electronics, a resonator is formed by a portion of the two conductor balanced transmission line with the conductors separated by air or another dielectric medium, and measurements of the resonant frequency and quality factor of the resonator are made. For example, such a dielectric medium may include a circulating fluid for temperature stabilization, or a high dielectric constant material for size reduction. In this type of embodiment, the opposite end of the transmission line is coupled to a terminating plate. Coupling to the resonator can then be provided by a conducting loop positioned close to the resonator. It is to be noted that an optional second coupling loop may be used for the measurement electronics.

Typically, the transmission line is operated in the odd mode, i.e., in a mode in which the current flow in one of the two conductors is opposite in direction to that in the other conductor.

The transmission line or the resonator may be partially enclosed by a metallic sheath. If a conducting sheath is used, the transmission line also supports an even mode, similar to that observed in a coaxial transmission line. When operated in the even mode, the interaction between the sample and the probe is similar to the coaxial symmetries.

When the probe is operated as a resonator, the two modes (odd and even) will in general result in two different resonant frequencies (due to dispersion), and can therefore be easily separated in the frequency domain to be powered and monitored independently. In order to enhance the dispersion, a piece of dielectric material is sandwiched between the conductors of the resonator.

The spacing between the two conductors of the resonator and their cross-sections must be properly chosen in order to maintain a resonator quality factor Q high enough for accurate measurements of the sample induced changes in the resonance frequency and the Q factor. For instance, the spacing has to be on the order of or greater than 1 mm, for Q>1000 at 10 GHz.

When the resonator is enclosed in a cylindrical sheath formed of a high electrically conductive material, the sheath simultaneously eliminates radiation from the resonator and the effect of the probe's environment on the resonator characteristics. At the same time, the sheath has an opening near the sample area, thus allowing an efficient coupling of the sample to the resonator. The upper part of the sheath makes an electrical contact with the terminating plate. The bottom part of the sheath may have a conical shape in order to provide physical and visual access to the sampling area.

The geometry of the cross-section of the probing end of the two conductor transmission line resonator determines the sampling volume, i.e., the spatial resolution of the measurement both laterally and in depth. Due to the symmetry of the near field electrical field distribution at the probing end, the subject novel probe allows for a determination of the in-plane anisotropy of the sample's complex permittivity. In particular, measurements obtained with different probe orientations can be compared or subtracted each from the other.

In order to obtain a high spatial resolution, the diameter of the two conductors of the resonator at the probing end as well as their spacing are reduced in size to the smallest possible dimension by tapering each of the two conductors to a desired cross-section and gradually reducing their separation down to a value smaller than, or comparable to their diameter.

Alternatively, the portion of each conductor closest to the sample can be replaced with a scanning tunneling microscopy (STM) tip or with a metal coated optical fiber which may be tapered to a sharp point. Alternatively, an optical fiber may be used onto which two metallic strips have been deposited on opposite sides. In the case of the optic fiber having two metallic strips embedded therein, the optical fiber is tapered to a sharp point whereby the two metallic lines are gradually brought into close proximity to each other.

Alternatively, the entire transmission line resonator may be formed from a single piece of an optical fiber (or other dielectric bar with cylindrical or similar cross-section) with either a non-tapered or tapered probing end. In this structure, the fiber including the tapered portion has two metallic strips deposited on opposite sides thereof.

Additionally, the portion of the transmission line closest to the sample may be replaced with a multi-layer structure formed on a flat substrate by the subsequent deposition of the first conducting line, a dielectric spacer layer, and the second conducting line. Additionally, the portion of the transmission line closest to the sample may be replaced with a tapered slot line formed on a flat substrate.

Preferably, the spacing between the two probes can be adjusted by moving one of the two conductors with respect to the other by, for example, means of a piezoelectric actuator. Alternatively, the separation between the two probes may be adjusted by electrostatic, magnetic, or other means. Variations of the separation between the two conductors results in a change in the distribution of the electric fields near the probing end, and thus, a modification of sampling volume. In this approach measurement of depth profiling may be accomplished.

In embodiments where a metal coated optical fiber is used, the desired separation between the fibers at the probing end can be monitored by means of measuring the amplitude and/or phase of an optical signal transmitted from one fiber to the other.

The distance between the probe and the sample can be controlled by tracking the microwave response, or by controlling a tunneling current between the probe and the conducting sample. Also, any other distance measuring mechanism known in the field of near field scanning optical microscopy can be employed. Such techniques include detection of shear force, tuning fork oscillators, and reflection at the sample surface of an optical signal originating in the optical fiber.

These and other novel features and advantages of this invention will be fully understood from the following detailed description of the accompanying Drawings.

DETAILED DESCRIPTION OF THE PREFERRED EMBODIMENT

Referring to FIGS. 1–11, there is shown a probe 10 for non-destructive determination of the complex permittivity of a sample 11 which is based on a balanced two conductor transmission line 12 and comprises two spatially separated symmetrically arranged electrical conductors 13 and 14 of cylindrical, semi-cylindrical, rectangular, or similar type cross-section. The conductors can be made out of copper, or of tungsten STM tips, or gold strips deposited onto a glass fiber, as will be disclosed in further paragraphs. A probing end 15 of the transmission line 12 is brought in close proximity to the sample 11 and an opposite end 16 of the transmission line 12 is either connected to electronics for the determination of a reflected signal's phase and magnitude, or to a terminating plate 17 to form a resonator structure 18 for the purposes described in following paragraphs.

The probe 10 is primarily envisioned in two embodiments:

A. In operation as a transmission line for feeding a signal to the sample 11 and measuring the phase and magnitude of the reflected signal. This transmission line is operated either in the odd mode, i.e., in a mode in which the current flow in one of the two conductors 13, 14 is opposite in direction to that in the other conductor; or in an even mode if a conducting sheath is used for enveloping the transmission line 12. In this embodiment, the behavior of the transmission line 12 is analogous to the case of symmetrically coupled microstrip lines inside an enclosure. When operated in the even mode, the interaction between the sample and the probe is similar to the coaxial symmetries known to those skilled in the art. Measurements of the phase and magnitude of the reflected signal by means of the transmission line arrangement are broadband in frequency but are generally not satisfactory with respect to sensitivity to the sample properties and require additional rather expensive and complex electronic equipment to be used, such as a vector network analyzer.

B. In order to obtain a more sensitive and accurate result while employing less expensive equipment, the probe 10 of the present invention is envisioned as a resonator structure 18 which is formed by a portion of the transmission line 12 with the conductors 13, 14 separated by a dielectric medium 19. The dielectric medium 19 may include air, a circulating fluid for temperature stabilization, or high dielectric constant materials for size reduction.

The probing end 15 of the resonator structure 18 is brought into proximity to the sample 11 (which can be ion-implanted silicon, metals, dielectric, metal films, or dielectric films on any substrate) with the opposite end 16 of the transmission line resonator structure 18 being coupled to the terminating plate 17, as best shown in FIGS. 1–3, 8 and 11. The resonator structure 18 is formed in order to measure the resonant frequency and quality factor of the resonator structure 18 for determination of the complex permittivity of the sample 11.

The spacing between the two conductors 13, 14 and their cross-section have to be properly chosen in order to maintain a resonator quality factor Q high enough for accurate measurements of the sample induced changes in the resonant frequency and the Q factor. For instance, the spacing between the conductors 13 and 14 has to be on the order of or greater than 1 mm for Q>1000 at 10 GHz.

When the probe 10 of the present invention is operated as the resonator, the odd and even modes of operation in general, result in two different resonant frequencies, due to dispersion of the signal and can therefore be easily separated in the frequency domain and powered as well as monitored independently. The dielectric medium 19 sandwiched between the conductors 13 and 14 serves to enhance such dispersion.

Figure 3:
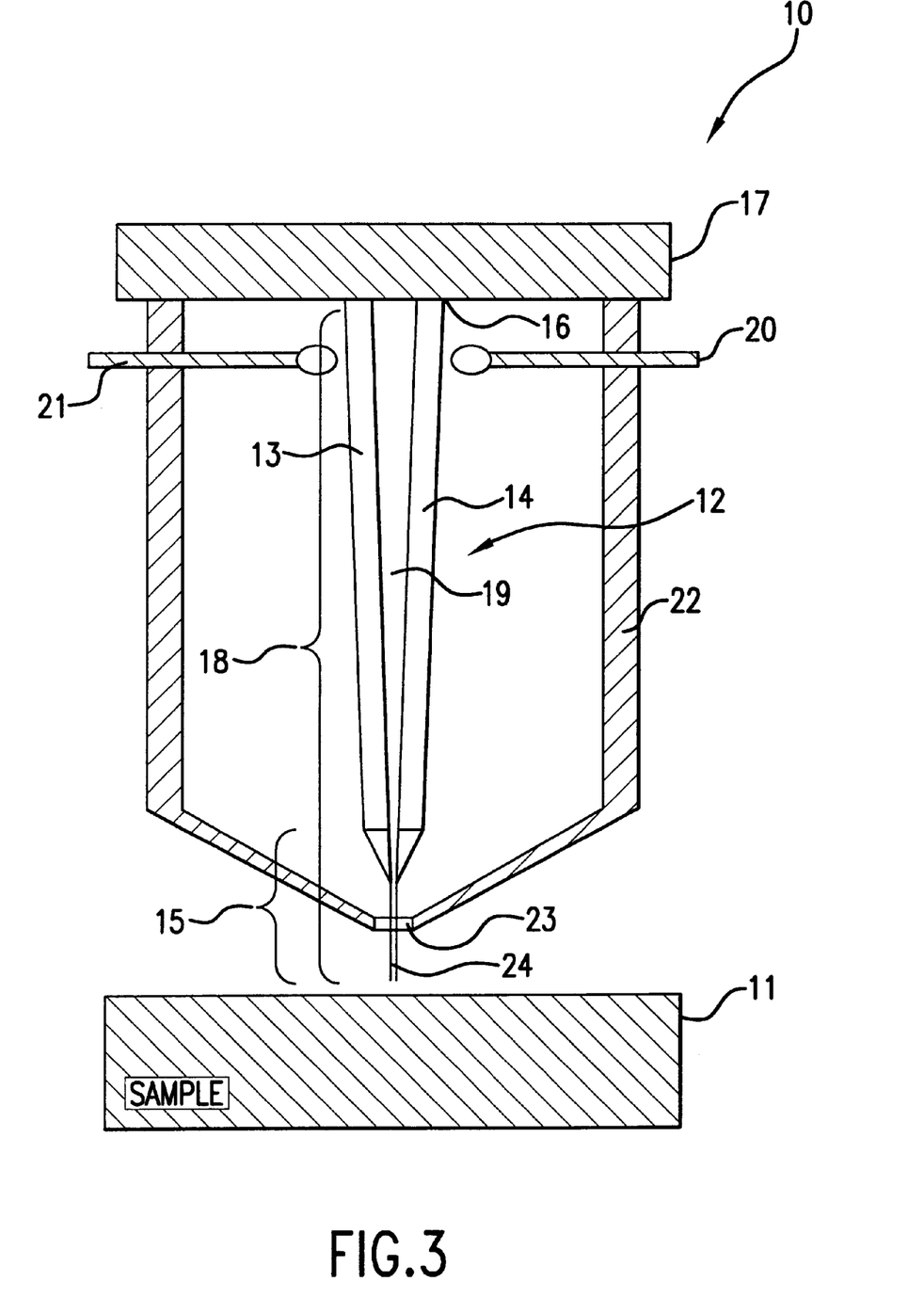
FIG. 3 schematically describes a two conductor transmission line resonator of the present invention enclosed into the sheath with the probing end protruding through and beyond the sheath.
Figure 8:
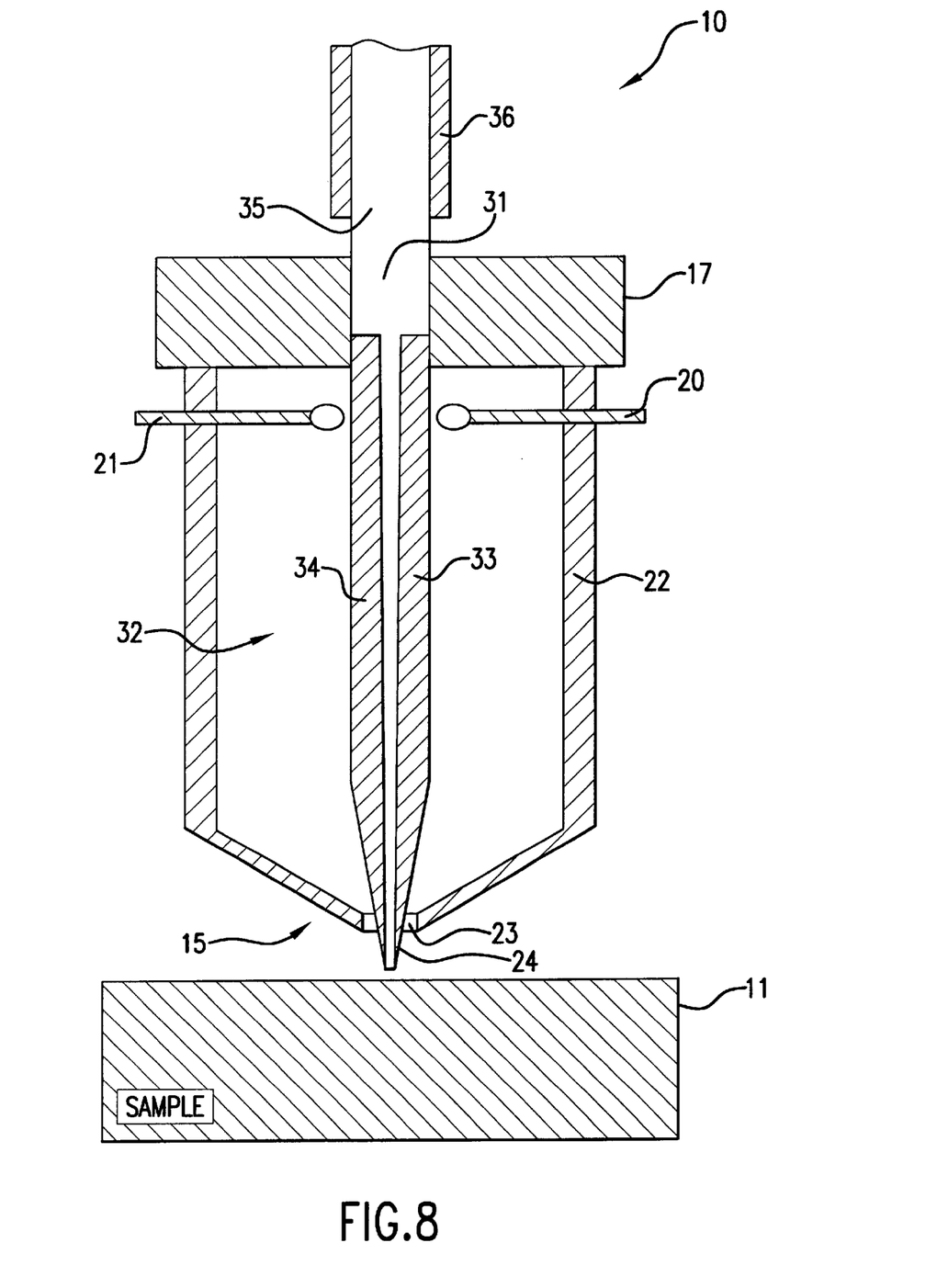
FIG. 8 shows schematically a resonator of the present invention formed by a tapered optical fiber with the two metallic strips embedded therein or deposited thereon.
Figure 11:
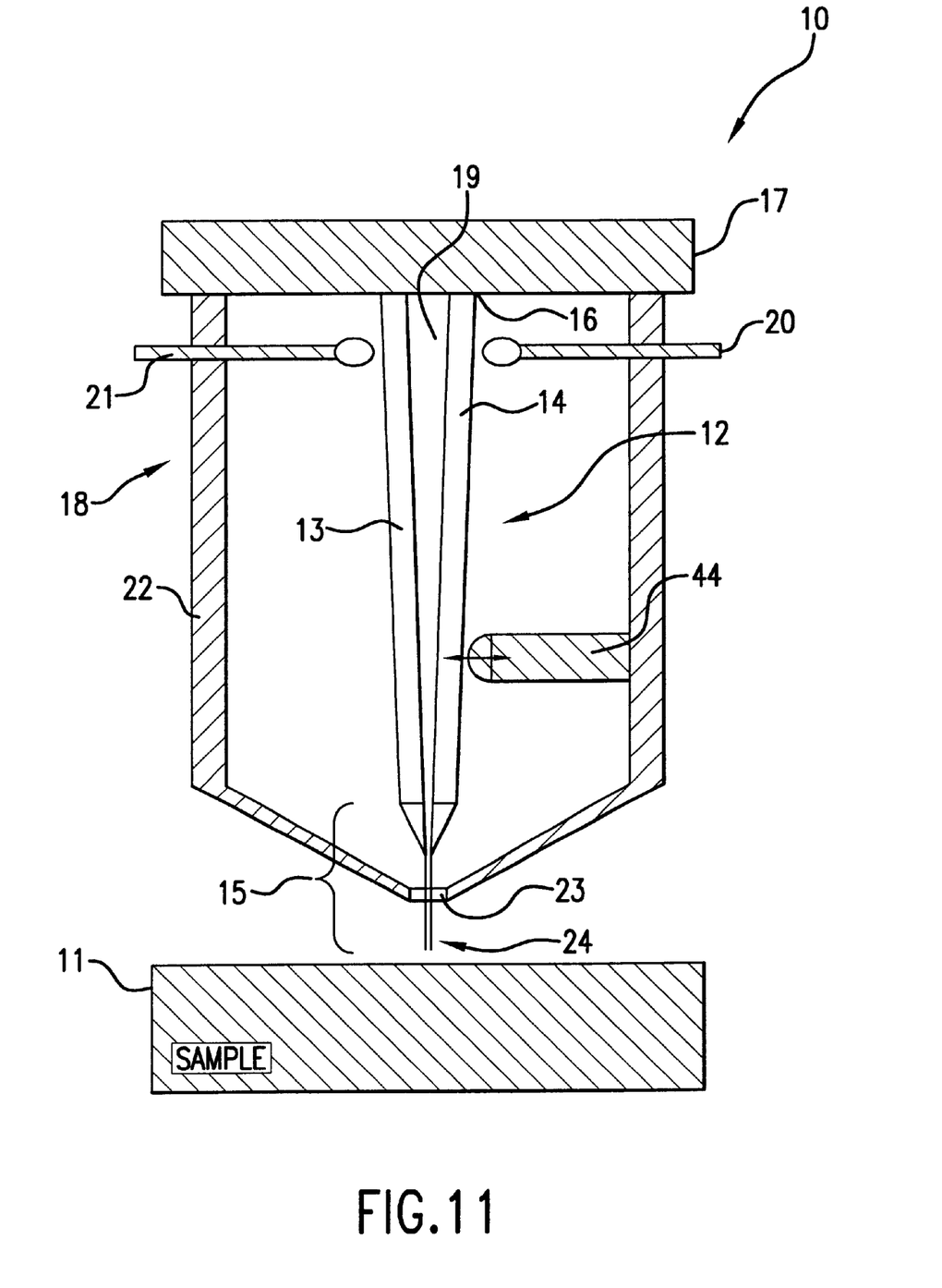

The coupling to the resonator 18 is accomplished by a coupling loop 20 positioned close to the resonator 18 and inside an optional conducting sheath (as best shown in FIGS. 3, 8 and 11 and as will be described in further paragraphs). An optional second coupling loop 21 may be used for the measurement electronics 50, schematically shown in FIG. 1. Alternatively, a circulator or directional coupler may be used to separate the signal reflected from the resonator 18 back into the feed loop. The resonant frequency and quality factor of the resonator structure 18 can be determined by techniques known to those skilled in the art. The resonant frequency and quality factor of the resonator structure 18 can be determined by techniques known to those skilled in the art. One commonly used configuration is shown in D. E. Steinhauer, C. P. Vahacos, S. K. Dutta, F. C. Wellstood, and S. M. Anlage, *Applied Physics Letters*, Volume 71, Number 12, Sep. 22, 1997, pages 1736–1738. In particular, a frequency-modulated microwave signal (typically at 5–10 GHz, 1 mW) is generated by a microwave source, such as the model HP83752A from Agilent Technologies (Palo Alto, Calif.), and is fed to the resonator. The reflected signal is routed via a circulator, such as model DMC6018 from DiTom (San Jose, Calif.) to a detector signal, such as model HP8473C from Agilent Technologies (Palo Alto, Calif.). The output of the diode is a voltage signal having a component at a frequency identical to that of the frequency modulation of the microwave source, which can be accurately detected using a lock-in amplifier, such as model 7220 from Perkin Elmer Analytical Instruments (Norwalk, Conn.). The voltage measured using the lock-in amplifier is proportional to the difference between the resonance frequency and the carrier frequency of the microwave source. A voltage component at twice the frequency of the modulation of the microwave signal is proportional to the quality factor of the resonator. This can again be measured using a lock-in amplifier, such as model 7220 from Perkin Elmer Analytical Instruments (Norwalk, Conn.). The complex permittivity of the sample can be determined, for example, by comparison of the measured quantities to calibration data obtained for known materials.

The resonator structure 18 of the present invention forms a $(2n+1)\lambda/4$ resonator (n=0, 1, 2, . . . ), and its length is determined by the frequency of the lowest mode, e.g., about 7.5 mm for 10 GHz.

The resonator structure 18 may be enclosed in a cylindrical sheath 22, as shown in FIGS. 3, 8, and 11, made of a highly conductive material (Cu, Au, Ag, Al). The sheath 22 eliminates both radiation from the resonator 18 and the effect of the probe environment on the resonator characteristics. In particular the changing influence of moving parts in the proximity of the resonator 18 is eliminated. At the same time, the sheath 22 has an opening 23 near the sample area, thus allowing for an efficient coupling of the sample 11 to the resonator 18 and thus permitting the resonant frequency and Q factor to be dependent on the sample microwave permittivity. In situations where the spacing between the conductors 13 and 14 is small in comparison to the inner diameter of the sheath 22, the resonator properties are substantially uneffected by the sheath presence. The upper part of the sheath 22 makes an electrical contact with the terminating plate 17. The bottom part of the sheath 22 may have a conical shape in order to provide clear physical and visual access to the sampling area.

As discussed in previous paragraphs, the probing end 15 of the resonator structure 18 is brought into close proximity to the sample 11 for measurement purposes. The geometry of the cross-section at the probing end 15 determines the sampling volume, i.e., the spatial resolution both laterally and in depth. Due to the symmetry of the near-field electrical field distribution at the probing end 15, the probe 10 of the present invention allows for a determination of the in-plane anisotropy of the complex permittivity of the sample 11. In particular, measurements (or entire scans) obtained with different probe orientations with respect to the sample 11 may be compared or subtracted each from the other for the anisotropy determination.

If the sheath 22 is used with the probe 10, the probing end 15 protrudes through and beyond the opening 23 made in the sheath 22. Because of the weak coupling between the sheath 22 and the resonator 18, the diameter of the opening 23 affects neither the field intensity at the probing end 15, nor the Q factor of the resonator 18 and does not affect the sample's contribution to the resonator 18 behavior. However, for optimum spatial selectivity (quantitative resolution), the diameter of the opening 23 should be less than the length of the portion 24 of the resonator 18 that extends beyond the sheath 22. This eliminates the interaction between the sample 11 and the weak near-field that is present in the immediate environment of the opening 23. Because of the quadrupole-like current distribution in the portion 24 of the resonator 18 outside the sheath 22, this portion of the resonator 18 as well as the opening area 23 produce a negligible amount of microwave far-field radiation. Additionally, no microwave current is present on the exterior surface of the sheath 22. Hence, the probe 10 produces significantly less radiation than conventional coaxial geometries, and mainly interacts with the sample 11 via the near-field contribution.

In order to obtain a high spatial resolution, in other words, in order to reduce the size of the volume over which the microwave properties of a sample are determined, the diameter of the conductors 13 and 14 at the probing end 15, as well as their spacing 19 must be reduced in size to the smallest possible dimension (less than 1 $\mu$m) which may be accomplished in several ways shown in FIGS. 2–10.

Figure 2:
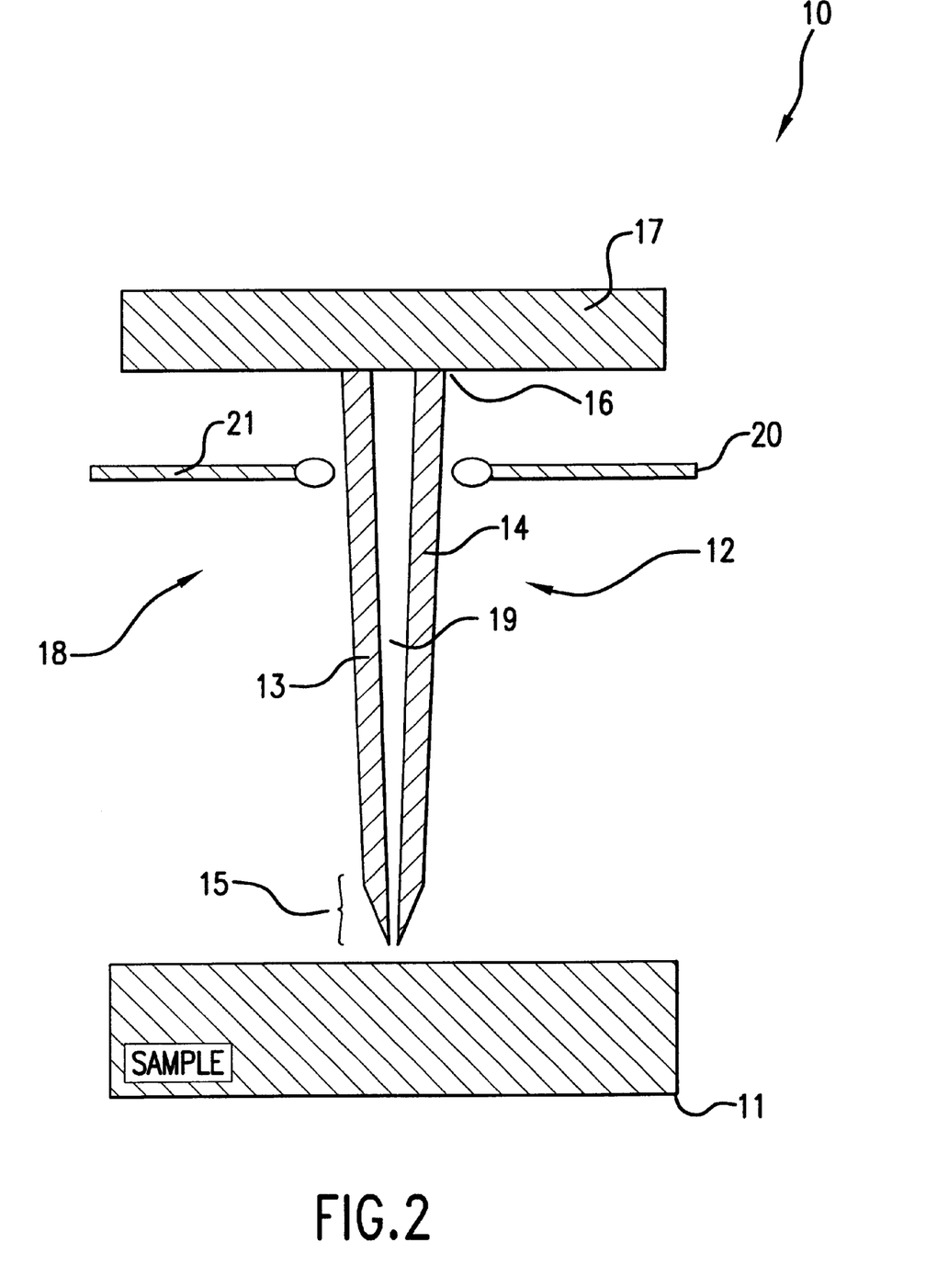
FIG. 2 schematically depicts a two conductor transmission line resonator of the present invention with a tapered probing end.

As shown in FIGS. 2 and 3, the small dimension of the resonator probing end 15 may be achieved by tapering each of the two conductors 13 and 14 down to the desired cross-section while simultaneously gradually reducing their separation down to a value smaller than, or comparable to their diameters.

Figure 4:
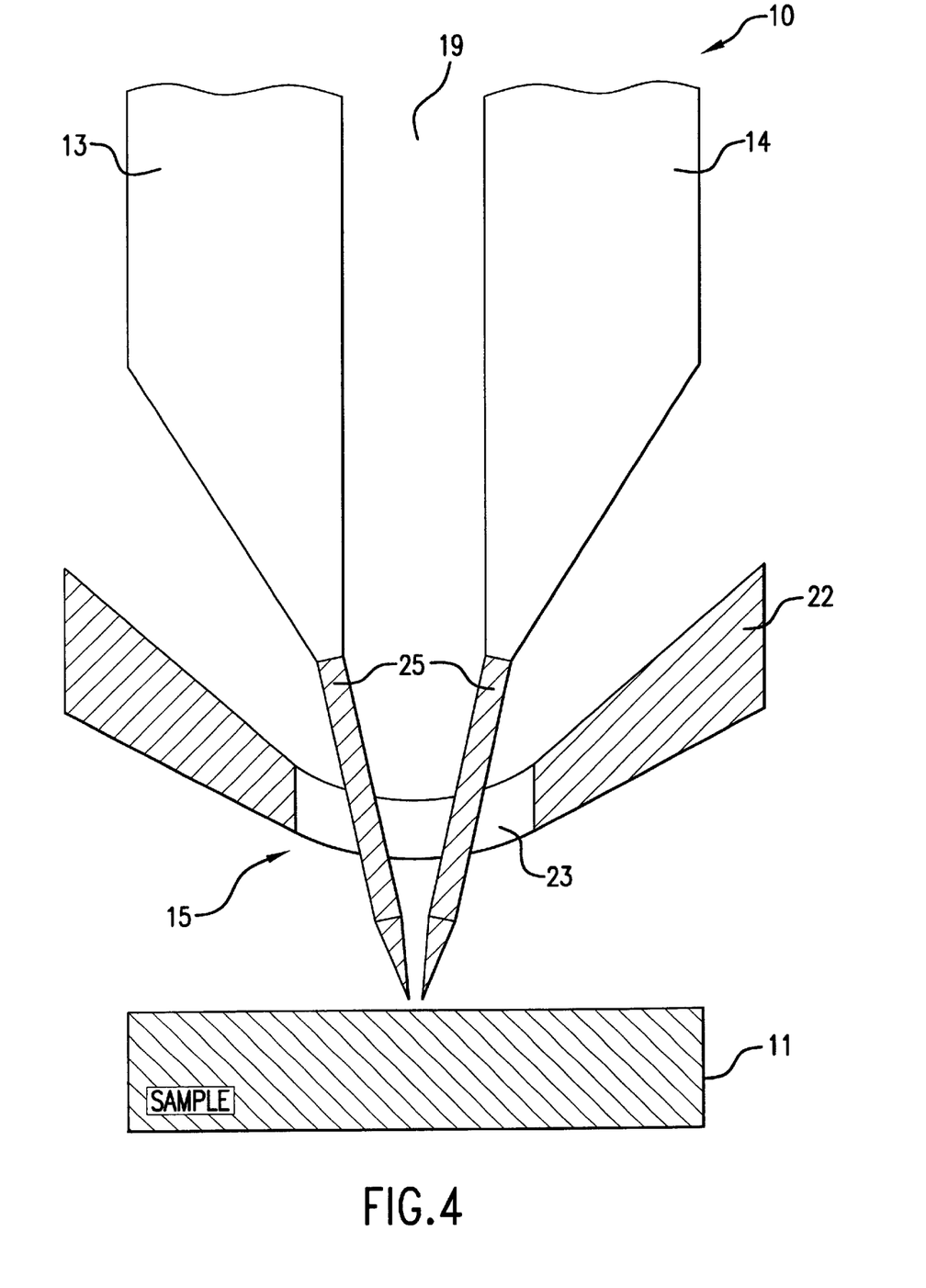
FIG. 4 schematically represents the probing end of the resonator of the present invention formed by two approaching scanning tunneling microscopy (STM) tips.

Shown in FIG. 4, the resonator probing end with small dimensions is achieved by replacing the portion of each conductor 13, 14 closest to the sample 11 with a scanning tunneling microscopy (STM) tip 25 which is commercially available from a number of suppliers.

Figure 5:
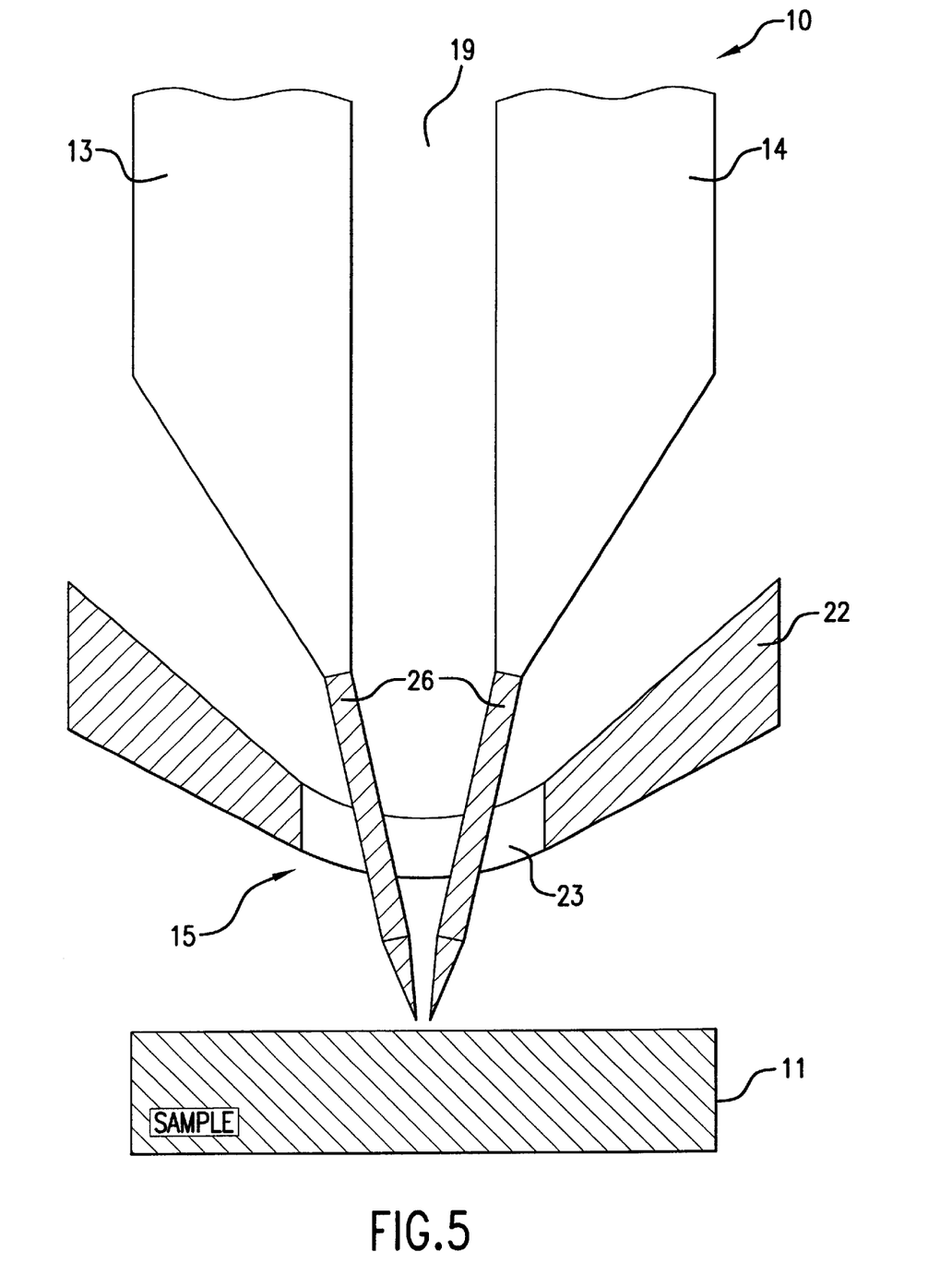
FIG. 5 is a schematical representation of the probing end of the resonator of the present invention formed by two approaching metal coated tapered optical fibers.

Shown in FIG. 5, the resonator probing end with small dimensions is achieved by replacing the portion of each conductor 13, 14 closest to the sample 11 with a metal coated optical fiber 26 which may be tapered to a sharp point as is done in near field optical microscopy.

Figure 6:
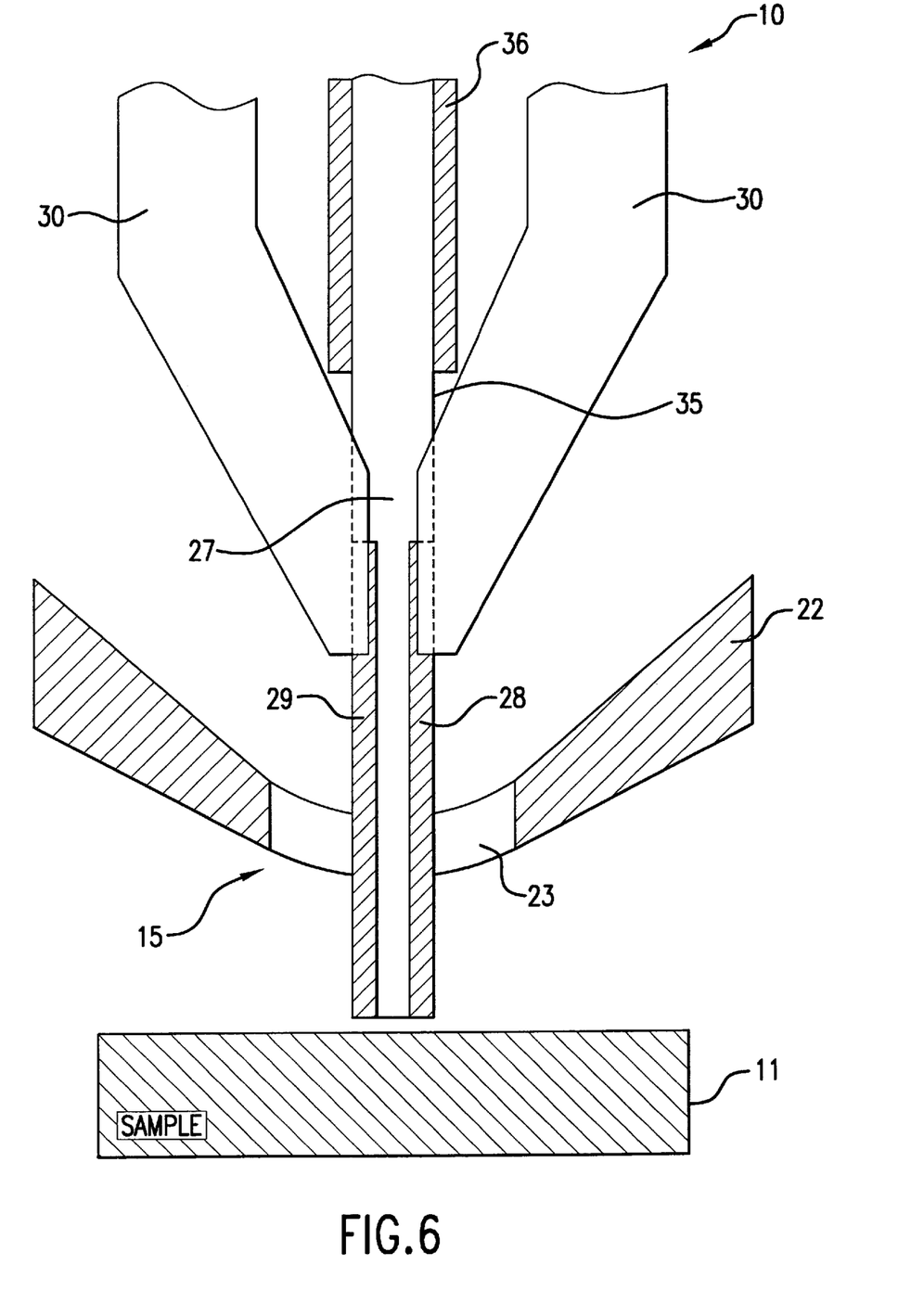
FIG. 6 shows schematically a probing end of the resonator of the present invention formed by an optical fiber with two metallic strips.
Figure 7:
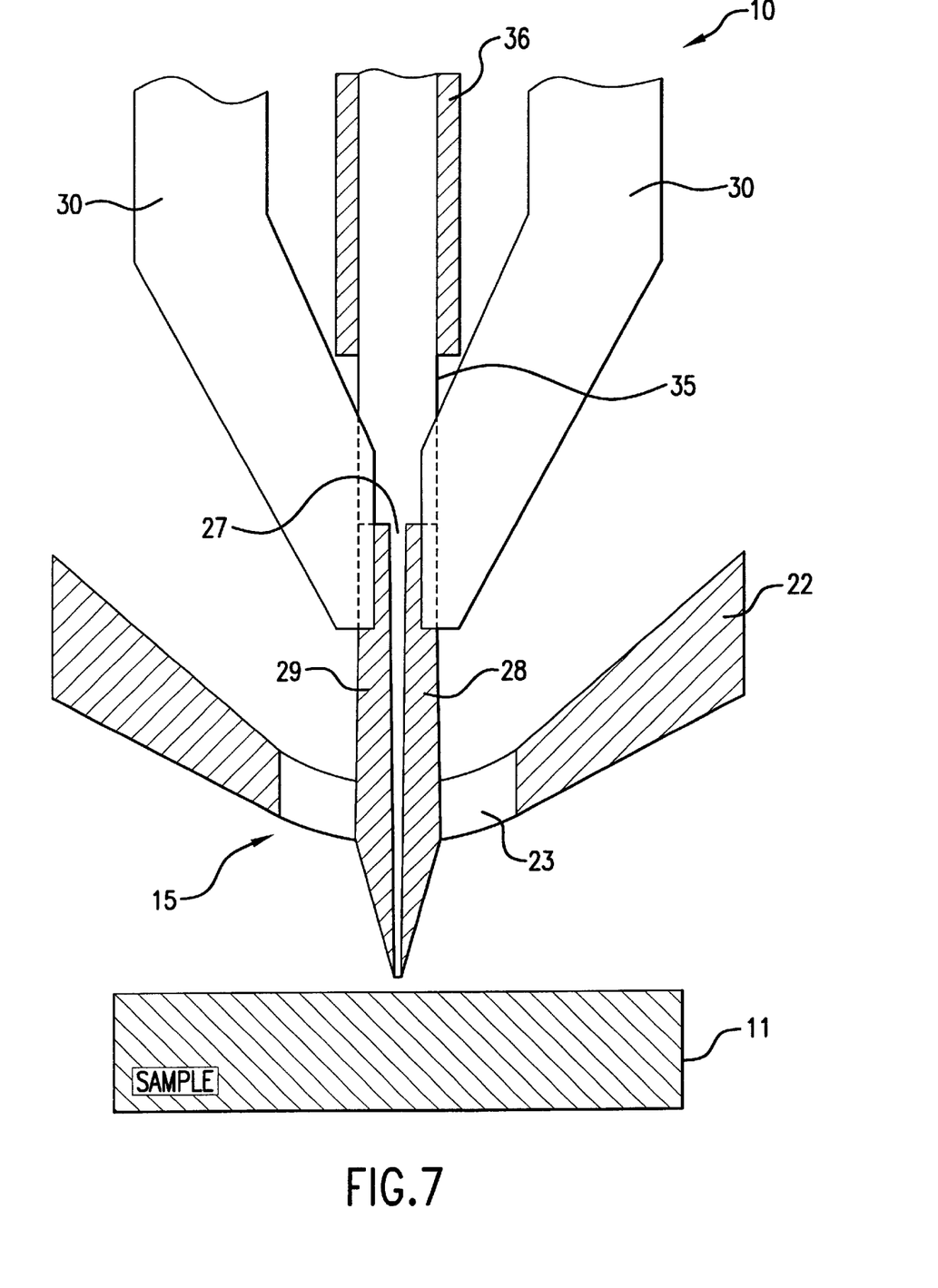
FIG. 7 shows schematically a probing end of the resonator of the present invention formed by a tapered optical fiber with two metallic strips.

The portion of the transmission line closest to the sample 11 can also be replaced with an optical fiber 27 onto which two metallic strips 28 and 29 are deposited on opposite sides of the optical fiber 27, as shown in FIGS. 6 and 7. The two metallic strips 28 and 29 may be deposited on the optical fiber 27 in such a manner that they form metallic lines tapered to a sharp point and simultaneously are gradually brought into close proximity to each other as best shown in FIG. 7. In the arrangement shown in FIGS. 6 and 7, a clamp 30 supports the optical fiber 27 in a predetermined orientation with respect to the sample 11.

Alternatively, the entire transmission line resonator 18 may be made up from a single piece of an optical fiber (or other dielectric bar with cylindrical or similar cross-section) with either a non-tapered or tapered probing end. Such an optical fiber 31, shown in FIG. 8, includes a resonator portion 32 having two metallic strips 33 and 34 deposited on opposite sides of the optical fiber 31, an exposed fiber cladding 35 protruding through the terminating plate 17 of the resonator structure 18, and a fiber jacket 36 surrounding the fiber cladding 35 and extending outside the sheath 22.

Figure 9:
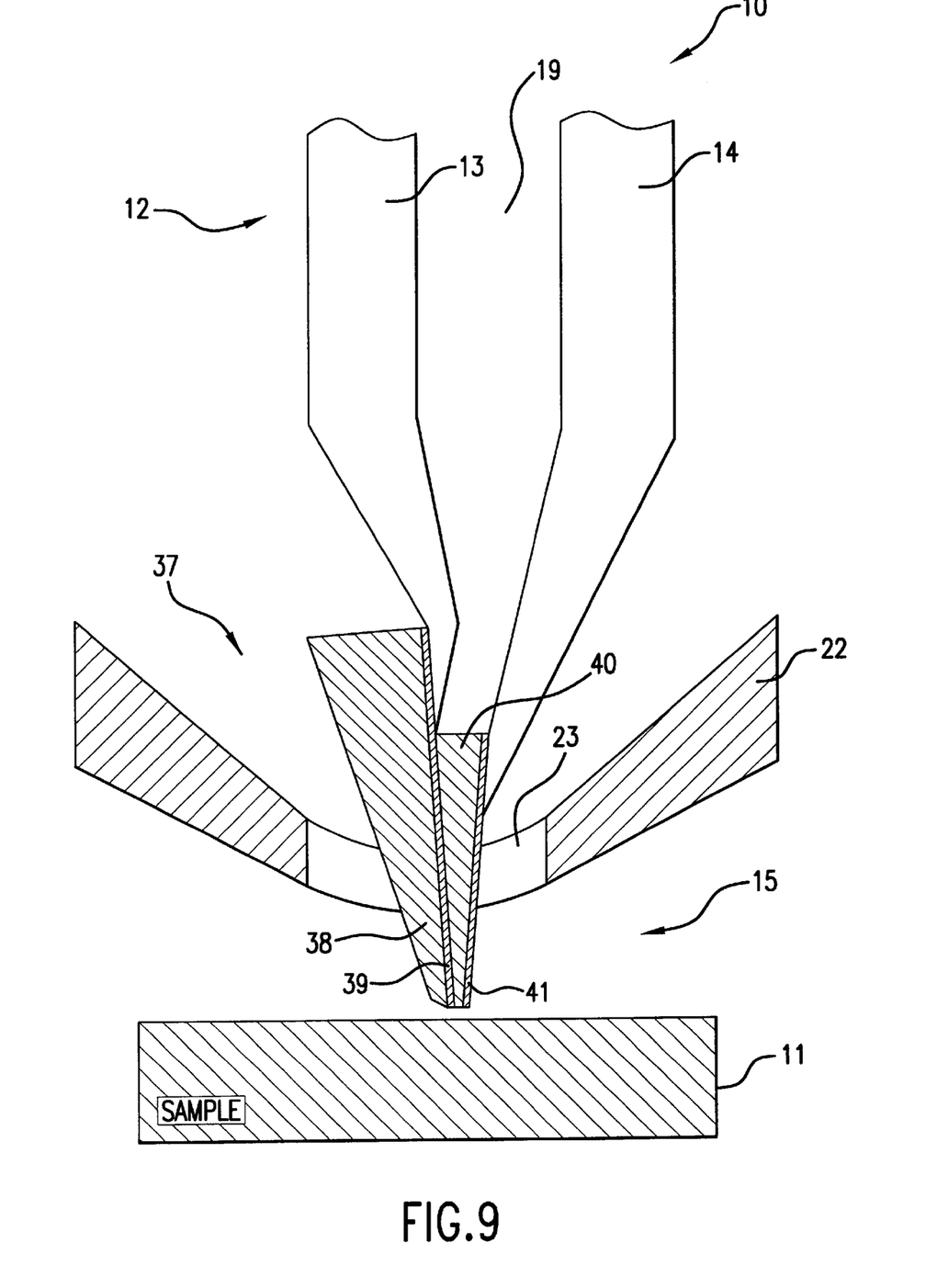
FIG. 9 schematically represents a probing end of the resonator of the present invention formed by a tapered strip line.

In still another embodiment of the probe 10 of the present invention shown in FIG. 9, the portion of the transmission line closest to the sample 11 is replaced with a multi-layer structure 37 formed on a flat substrate 38 by the subsequent deposition of the first conducting line 39, a dielectric spacer layer 40 and the second conducting line 41 thus forming a geometry referred to as a strip line.

Figure 10:
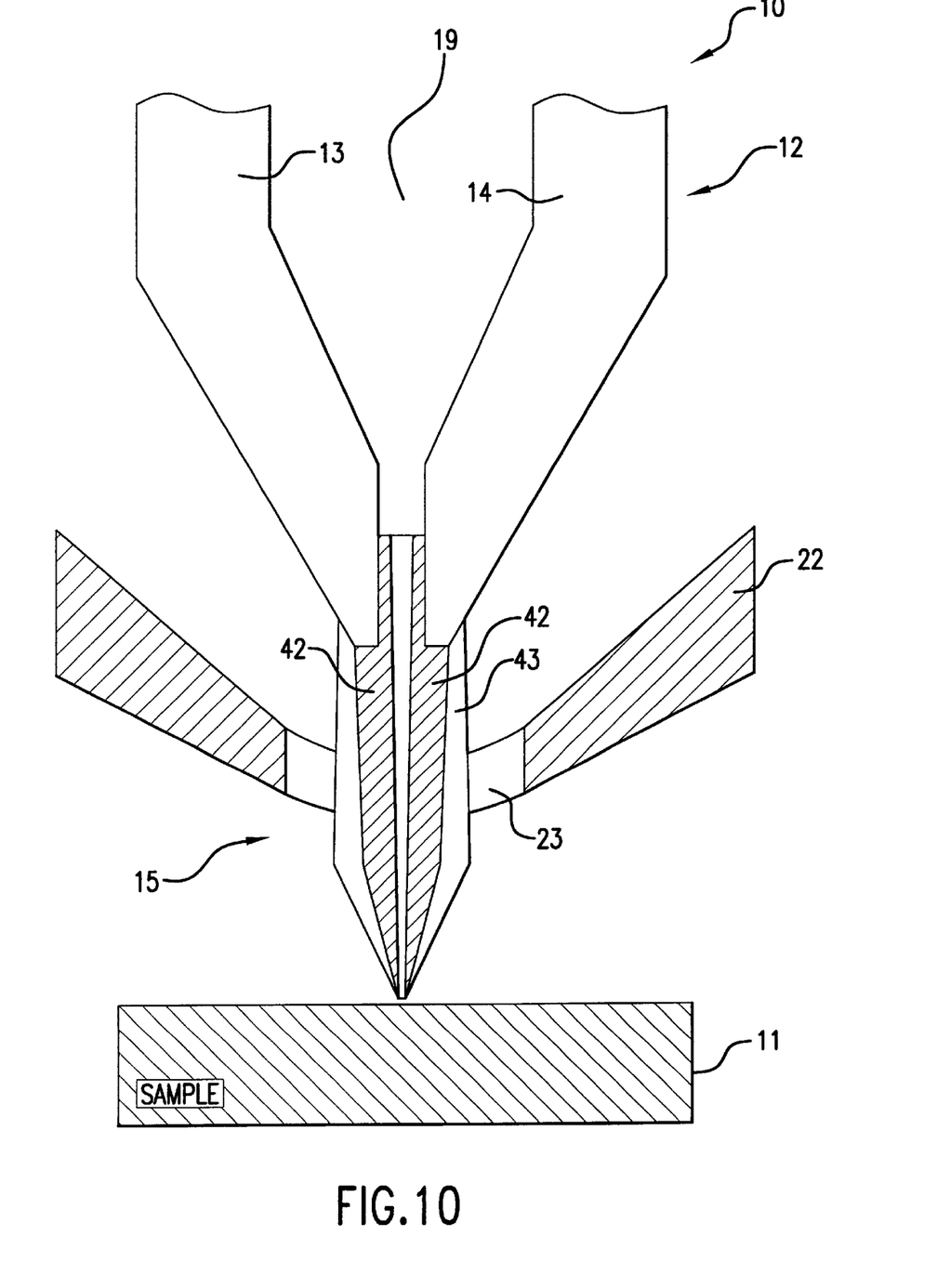
FIG. 10 schematically depicts a probing end of the resonator of the present invention formed by a tapered slot line; and, FIG. 11 schematically describes a microscope probe of the present invention with the continuously variable depth selectivity.

A still further embodiment of the probing end 15 of the resonator 18 is shown in FIG. 10 where the portion of the transmission line closest to the sample 11 is replaced with a tapered slot line 42 formed on a flat dielectric substrate 43.

In the embodiment shown in FIGS. 5–8, the optical fiber(s) may be used simultaneously for investigating the sample 11 by means of the scanning near field optical microscopy, determination of or changing the sample photoconductivity, or any one of a number of fiber based localized optical methods.

The probe 10 of the present invention permits variation of the separation between the conductors 13, 14 that results in a change in the distribution of the electric field near the probing end 15 which allows for modification of the sampling volume and for depth profiling. In the embodiment shown in FIGS. 2–5, the spacing between the two probes at the probing end 15 can be adjusted by moving one of the two conductors 13 or 14 with respect each to the other. In particular, a piezoelectric actuator 44 can be used to this end, as shown in FIG. 11. Alternatively, the separation between the two probes at the probing end 15 may be adjusted by one of any other well known electrostatic, magnetic, or other type mechanisms.

In the embodiment shown in FIG. 5, the desired separation between the fibers 26 at the probing end 15 may be monitored by means of measuring the amplitude and/or phase of an optical signal transmitted from one fiber 26 to the other.

In the embodiment shown in FIGS. 6 and 7, the fiber 27 with two conducting metal strips 28 and 29 is loaded into the resonator via the through holes formed in the terminating plate at the top of the probe 10.

Figure 1:
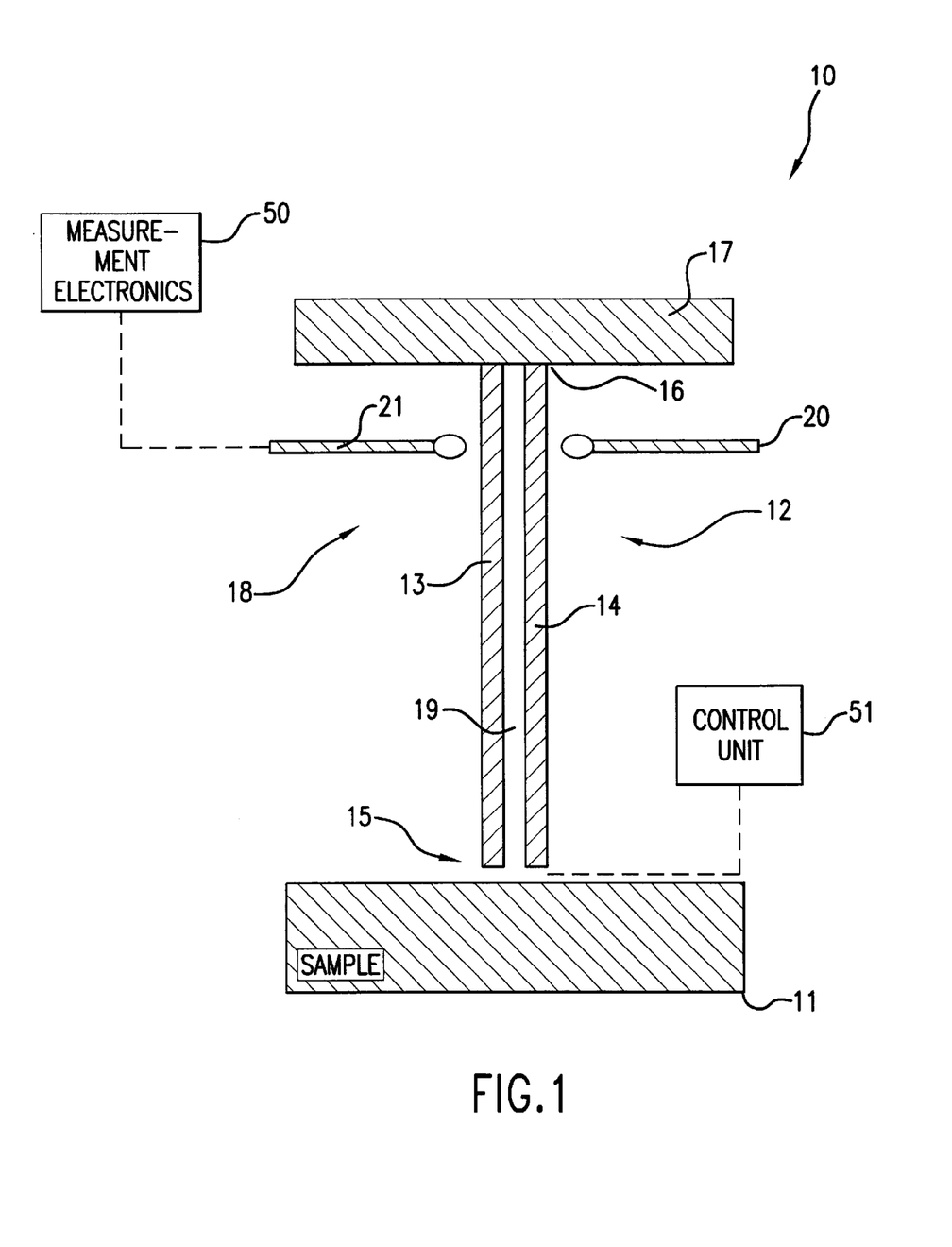
FIG. 1 schematically depicts a two conductor transmission line resonator of the present invention with a non-tapered probing end.

In all embodiments shown in FIGS. 1–10, the distance between the probe 10 and the sample 11 is controlled by a unit 51, schematically shown in FIG. 1, which serves for either tracking the microwave response, or for controlling a tunneling current between the probe 10 and the conducting sample 11. In the embodiments shown in FIGS. 2–5, a separate tunneling current feedback can be used for both ends 15 and 16 of the transmission line 12, resulting in independent distance control for each conductor 13 and 14. This facilitates measurements on uneven surfaces, sloped samples, etc. Simultaneously acquired topography information can be used to correct for geometry changes.

In embodiments shown in FIGS. 5–8, the unit 51 (schematically shown in FIG. 1) may include any distance mechanism known in the field of near field scanning optical microscopy. This includes detection of shear force, tuning fork oscillators, and reflection at the sample surface of an optical signal originating at the fiber. For the detection of shear force between the probe 10 and the sample 11, either the probe or the sample will have to be mechanically vibrated laterally. The small size of the resonator 18 of the present invention allows for the entire probe 10 to be vibrated while maintaining the sample fixed, as shown particularly with respect to the embodiments depicted in FIG. 8.

In the embodiment shown in FIG. 5, this distance feedback can be applied individually to both fibers 26, resulting in independent distance control for each conductor. This approach facilitates measurements on uneven surfaces, sloped samples, etc., and simultaneously acquired topography information may be used to correct for geometry changes.

In the embodiments shown in FIGS. 2–5, the center of the sampling area is physically accessible for additional probes, contrary to the case of coaxial geometry. In particular, integration of the methods for a measurement of the probe-to-sample distance is straightforward. Such methods may include optical fibers, laser beams, shear force sensors, or others, similar to what has been described in previous paragraphs for embodiments shown in FIGS. 5–8.

In the case of embodiments shown in FIGS. 2–5, for measurement of the probe-to-sample distance, the following particular configurations may be used:

1) Positioning a shear-force sensor between the two microwave conductors. Such a sensor is typically manufactured from a dielectric material, which does not distort the distribution of the microwave fields in the sampling area.

2) Positioning an optical fiber between the two microwave conductors. An optical signal emitted from the end of the optical fiber will be reflected back into the fiber. Detection of phase and/or amplitude of the reflected optical signal provides information about the probe-to-sample separation.

3) In the case where the sample is a diffuse reflector of light, an incident laser beam can be steered down vertically through a hole in the terminating plate and focused onto the sample area between the two electrical conductors; and a position-sensitive detector is used to determine the position of the laser spot on the sample with respect to a fixed point on the apparatus. If all optical components and the microwave resonator are mounted on a common reference structure, the probe-to-sample separation is determined. Such distance sensors are well known in the art and are commercially available.

4) In the case where the sample is a specular reflector of light, a laser beam may be focused at an angle onto the sample space between the two electrical conductors and a position-sensitive detector is used to determine the position of the laser spot on the sample with respect to a fixed point on the apparatus. If all optical components and the microwave resonator are mounted on a common reference structure the probe-to-sample separation is determined. Such distance sensors are well known in the art and are commercially available.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended Claims.

What is claimed is:

1. A probe for localized measurements of complex permittivity of a sample, the probe comprising:
   a balanced two-conductor transmission line including at least a pair of conductors extending in spaced relationship therebetween and spaced by a dielectric media, said transmission line having a probing end positioned in substantial proximity to the sample, said probing end of said transmission line including a pair of converging metal coated tapered optical fibers; and,
   measuring means for measuring the effect of said sample on either one of:
      (a) the capacitance and dissipation measured between said conductors of said transmission line; and,
      (b) the complex reflection coefficient of a microwave signal at said probing end of said transmission line.

2. The probe as recited in claim 1, further comprising a resonator structure for measuring the reflection coefficient, said resonator structure comprising
   said transmission line coupled at one end thereof to a terminating plate; and
   at least one coupling probe operatively coupled to said resonator structure for resonating same.

3. The probe as recited in claim 2, wherein said probe further comprises means of measuring the quality factor and the resonance frequency of said resonator structure.

4. The probe as recited in claim 2, further including a second coupling probe operatively coupled at one end thereof to said resonator structure and coupled to said measuring means at another end thereof.

5. The probe as recited in claim 2, wherein said resonator structure includes an optical fiber extending from said terminating plate and tapered towards said sample, said first and second conductors being formed by a pair of metal strips embedded into or deposited onto said optical fiber.

6. The probe as recited in claim 5, wherein said optical fiber protrudes through said terminating plate.

7. The probe as recited in claim 1, wherein said dielectric media includes at least one element of the group consisting of air, circulated liquid, and high dielectric constant material.

8. The probe as recited in claim 1, further comprising means for modification of spacing between said first and second conductors of said transmission line.

9. The probe as recited in claim 1, further comprising means for controlling distance between said probing end of said transmission line and said sample.

10. The probe as recited in claim 1, further including a conductive sheath enveloping said transmission line, said sheath having an opening defined therein in proximity to said sample, said probing end of said transmission line protruding through said opening towards said sample.

11. The probe as recited in claim 1, wherein said first and second conductors extend substantially in parallel each to the other.

12. The probe as recited in claim 1, wherein the spacing between said first and second conductors diminishes in the direction towards said probing end of said transmission line.

13. The probe as recited in claim 1, wherein the ends of said first and second conductors at said probing end of said transmission line are tapered towards said sample.

14. The probe as recited in claim 1, wherein said probing end of said transmission line includes a pair of converging scanning tunneling microscopy tips.

15. The probe as recited in claim 1, wherein said probing end of said transmission line includes a multilayer tapered strip line structure.

16. The probe as recited in claim 1, wherein said probing end of said transmission line includes a tapered slot line formed on a flat dielectric substrate.

17. A probe for localized measurements of complex permittivity of a sample, the probe comprising:

a balanced two-conductor transmission line including at least a pair of conductors extending in spaced relationship therebetween and spaced by a dielectric media, said transmission line having a probing end positioned in substantial proximity to the sample, said probing end of said transmission line including an optical fiber having a pair of conductive strips formed thereon and extending along said optical fiber in spaced relationship therebetween; and, measuring means for measuring the effect of said sample on either one of:
  (a) the capacitance and dissipation measured between said conductors of said transmission line; and,
  (b) the complex reflection coefficient of a microwave signal at said probing end of said transmission line.

18. The probe as recited in claim 17, wherein said conductor strips extend in parallel each to the other.

19. The probe as recited in claim 17, wherein said conductive strips are tapered and converge in the direction towards said sample.

* * * * *